(12) United States Patent
Cavataio et al.

(10) Patent No.: US 9,339,800 B2
(45) Date of Patent: May 17, 2016

(54) METHODS FOR TREATING ENGINE EXHAUST

(71) Applicant: Ford Global Technologies, LLC, Dearborn, MI (US)

(72) Inventors: Giovanni Cavataio, Dearborn, MI (US); Hungwen Jen, Troy, MI (US); James Robert Warner, Ferndale, MI (US); James W. Girard, Belleville, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/805,617

(22) Filed: Jul. 22, 2015

(65) Prior Publication Data

US 2015/0321181 A1   Nov. 12, 2015

Related U.S. Application Data

(62) Division of application No. 12/706,346, filed on Feb. 16, 2010, now Pat. No. 9,120,056.

(51) Int. Cl.
*B01D 53/56* (2006.01)
*B01D 53/94* (2006.01)
(Continued)

(52) U.S. Cl.
CPC ........... *B01J 29/072* (2013.01); *B01D 53/9418* (2013.01); *B01J 23/72* (2013.01);
(Continued)

(58) Field of Classification Search
CPC ...... B01J 53/944; B01J 53/945; B01J 29/044; B01J 29/072; B01J 2229/62; B01J 21/04; B01J 21/08; B01J 23/40; B01J 23/72; B01J 23/745

USPC ........ 423/213.5, 213.7; 502/66, 74, 244, 245, 502/258, 327, 331, 332, 336, 338, 345, 346, 502/355, 415, 439, 527.19
See application file for complete search history.

(56) References Cited

U.S. PATENT DOCUMENTS 5,010,051 A   4/1991   Rudy
5,882,607 A   3/1999   Miyadera et al.
(Continued)

FOREIGN PATENT DOCUMENTS

EP          1834690 A1      9/2007
WO      2007/037593 A1      4/2007
(Continued)

OTHER PUBLICATIONS

Petr Koci et al, Modelling of Catalytic Monolith Converters with low-and high-temperature NOx storage compounds and differentiated washcoat, Chemical Engineering Journal, vol. 97, 2004, pp. 131-139.

(Continued)

*Primary Examiner* — Cam N. Nguyen
(74) *Attorney, Agent, or Firm* — Damian Porcari; Brooks Kushman P.C.

(57) ABSTRACT

A method for treating engine exhaust. The method includes contacting an NOx exhaust with an upstream catalyst material coated onto a substrate and including copper or iron loaded in a first zeolite at an upstream loading of 0 to 3.5 g/l to convert the NOx exhaust in a first temperature range of 150° C. to 500° C. to a first NOx converted exhaust. The method further includes contacting the first NOx converted exhaust with a downstream catalyst material coated onto the substrate downstream of the upstream catalyst material and including copper or iron loaded in a second zeolite at a downstream loading of 1.5 to 9.5 g/l to convert the first NOx converted exhaust in a second temperature range of 450° C. to 700° C.

20 Claims, 8 Drawing Sheets

(51) Int. Cl.

| | |
|---|---|
| *B01J 8/02* | (2006.01) |
| *B01J 29/00* | (2006.01) |
| *B01J 29/06* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 23/40* | (2006.01) |
| *B01J 23/42* | (2006.01) |
| *B01J 23/56* | (2006.01) |
| *B01J 23/70* | (2006.01) |
| *B01J 23/72* | (2006.01) |
| *B01J 23/74* | (2006.01) |
| *B01J 20/00* | (2006.01) |
| *B01J 29/072* | (2006.01) |
| *B01J 35/00* | (2006.01) |
| *B01J 37/02* | (2006.01) |
| *B01J 23/745* | (2006.01) |
| *B01J 35/04* | (2006.01) |

(52) U.S. Cl.
CPC .......... *B01J 23/745* (2013.01); *B01J 35/0006* (2013.01); *B01J 35/04* (2013.01); *B01J 37/0246* (2013.01); *B01D 53/9477* (2013.01); *B01D 2251/2062* (2013.01); *B01D 2251/2067* (2013.01); *B01D 2255/20738* (2013.01); *B01D 2255/20761* (2013.01); *B01D 2255/50* (2013.01); *B01D 2255/9022* (2013.01); *B01D 2255/9032* (2013.01); *B01D 2279/30* (2013.01); *Y02T 10/24* (2013.01)

(56) References Cited

U.S. PATENT DOCUMENTS

| | | | |
|---|---|---|---|
| 5,935,530 | A | 8/1999 | Langer et al. |
| 6,007,699 | A | 12/1999 | Cole |
| 6,125,629 | A | 10/2000 | Patchett |
| 7,264,785 | B2 | 9/2007 | Blakeman et al. |
| 7,743,602 | B2 | 6/2010 | Kalyanaraman et al. |
| 7,803,338 | B2 | 9/2010 | Socha et al. |
| 8,709,365 | B2 * | 4/2014 | Dornhaus ............ B01D 53/944 422/177 |
| 8,715,602 | B2 * | 5/2014 | Collier ............... B01D 53/9418 423/213.2 |
| 8,920,759 | B2 * | 12/2014 | Lee ...................... B01D 53/945 423/213.5 |
| 9,040,006 | B1 * | 5/2015 | Patchett ............... B01D 5/0054 423/213.2 |
| 2006/0251548 | A1 | 11/2006 | Willey et al. |
| 2010/0077737 | A1 | 4/2010 | Girard et al. |
| 2011/0047983 | A1 | 3/2011 | Lee et al. |

FOREIGN PATENT DOCUMENTS

| | | |
|---|---|---|
| WO | 2007/077462 A1 | 7/2007 |
| WO | 2008/006427 A1 | 1/2008 |

OTHER PUBLICATIONS

W. Addy Majewski, Lean NOx Catalyst, DieselNet Technology Guide, www.DieselNetcom., Revision Jan. 2004, pp. 1-14.

* cited by examiner

METHODS FOR TREATING ENGINE EXHAUST

CROSS-REFERENCE TO RELATED APPLICATIONS

This application is a divisional of U.S. application Ser. No. 12/706,346 filed Feb. 16, 2010, which issued on Sep. 1, 2015 as U.S. Pat. No. 9,120,056, the disclosure of which is hereby incorporated in its entirety by reference herein.

TECHNICAL FIELD

The present invention relates to methods for treating engine exhaust and methods for forming catalyst assemblies for treating engine exhaust.

BACKGROUND

Like gasoline engines, diesel engines have been widely used for transportation and stationary applications. A combustion exhaust from diesel engines often contains a variety of combustion waste materials including unburned hydrocarbon (HC), carbon monoxide (CO), particulate matter (PM), nitric oxide (NO), and nitrogen dioxide ($NO_2$), with NO and $NO_2$ collectively referred to as nitrogen oxide or $NO_x$. Removal of CO, HC, PM, and $NO_x$ from the combustion exhaust is needed for cleaner emissions. The combustion exhaust treatment becomes increasingly important in meeting certain emission requirements.

Conventional emission control systems often use selective catalytic reduction (SCR) catalyst for the reduction of $NO_x$. Urea SCR technology using base metal containing catalysts, in particular, is under development to reduce $NO_x$ emission from lean gasoline and diesel engine exhaust gas. Efficient $NO_x$ reduction is needed in a relatively broad temperature range, for instance at low temperatures during cold start events and at high temperatures during diesel particulate filter (DPF) events and lean gasoline highway conditions.

SUMMARY

According to one embodiment, a method for treating engine exhaust is disclosed. The method includes contacting an NOx exhaust with an upstream catalyst material coated onto a substrate and including copper or iron loaded in a first zeolite at an upstream loading of 0 to 3.5 g/l to convert the NOx exhaust in a first temperature range of 150° C. to 500° C. to a first NOx converted exhaust. The method further includes contacting the first NOx converted exhaust with a downstream catalyst material coated onto the substrate downstream of the upstream catalyst material and including copper or iron loaded in a second zeolite at a downstream loading of 1.5 to 9.5 g/l to convert the first NOx converted exhaust in a second temperature range of 450° C. to 700° C.

In another embodiment, a method of forming a catalyst assembly for treating engine exhaust is disclosed. The method includes coating an upstream substrate with an upstream catalyst material including copper at an upstream loading. The method further includes coating a downstream substrate with a downstream catalyst material including copper at a downstream loading. The upstream and downstream copper loading is substantially uniform and the upstream and downstream catalyst materials have an increasing coating thickness in an exhaust flow direction.

In yet another embodiment, a method of forming a catalyst assembly for treating engine exhaust is disclosed. The method includes coating an upstream substrate with an upstream catalyst material including copper at an upstream loading. The method further includes coating a downstream substrate with a downstream catalyst material including copper at a downstream loading. The upstream and downstream copper loadings are substantially uniform. The upstream and downstream catalyst materials have an increasing coating thickness in an exhaust flow direction. One of the upstream and the downstream substrates is a wall flow ceramic substrate.

BRIEF DESCRIPTION OF THE DRAWINGS

FIG. 1d depicts a schematic view of a broadened temperature window for $NO_x$ conversion realized by the catalyst of FIG. 1a;

FIG. 2b depicts an enlarged cross section of the catalyst of FIG. 2a;

FIG. 3d depicts an enlarged view of the area "cc" of FIG. 2b;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in the description and in the claims are to be understood as modified by the word "about" in describing the broader scope of this invention. Also, unless expressly stated to the contrary, the description of a group or class of material as suitable or preferred for a given purpose in connection with the invention implies that mixtures of any two or more members of the group or class may be equally suitable or preferred.

With respect to the Figures that will be described in detail below, like numerals are used to designate like structures throughout the Figures.

In one or more embodiments, "SCR" means selective catalytic reduction and includes a reducing catalyst which speeds or enhances a chemical reduction of NO$_x$ through the assistance of a reductant. In certain particular instances, the selective catalytic reduction catalyst is supported on a flow-through honeycomb monolith substrate and/or a wall-flow honeycomb monolith substrate.

In one or more embodiments, "NO$_x$" means nitrogen oxide and illustratively includes a mixture of compounds of nitric oxide (NO) and nitrogen dioxide (NO₂).

In one or more embodiments, "DPF" or "DF" refers to the particulate filter employed to remove particulate matter or the like. In certain particular instances, the particular filter is based on a wall-flow honeycomb monolith substrate.

In one or more embodiments, emission control systems typically use selective catalytic reduction (SCR) catalysts to convert certain waste materials including NO$_x$ to form less harmful counterparts such as N₂, for safer emissions. Ammonia is a commonly used reductant for SCR catalyst catalyzed NO$_x$ conversion. Decomposition of urea and subsequent reduction of NO$_x$ typically occurs according to the following scheme:

Urea Decomposition:

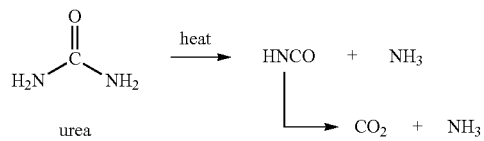

NO$_x$ Reduction:

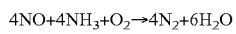

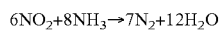

According to one aspect of the present invention, an emission control system is provided for reducing waste species from the exhaust of an internal combustion engine. The waste species from the exhaust of an internal combustion engine may include unburned hydrocarbon (HC), carbon monoxide (CO), particulate matters (PM), nitric oxide (NO), and nitrogen dioxide (NO₂), with NO and NO₂, collectively referred to as nitrogen oxide or NO$_x$.

Figure 1A:
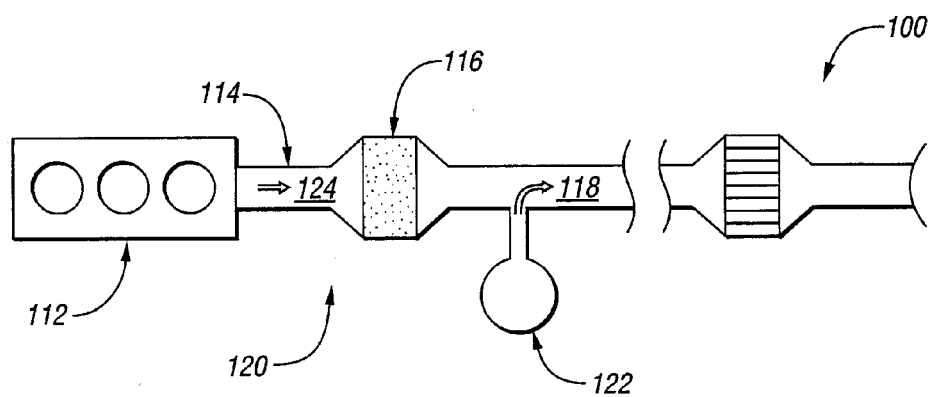
FIG. 1a depicts an emission control system containing a catalyst according to one aspect of the present invention, for reducing waste materials from the exhaust of an internal combustion engine.

In one or more embodiments, and as depicted in FIG. 1a, an emission control system, generally shown at 120, includes an exhaust passage 114 for transporting the exhaust 124 from the engine 112, a reductant 118 disposed within the exhaust passage 114 downstream of the engine 112, and a catalyst assembly 100 which is to be described in more details herein below. The reductant 118 includes ammonia, liquid urea, solid urea, or combinations thereof and can be optionally supplied from a container 122. In at least another embodiment, an oxidation catalyst 116 is disposed in the passage 114 upstream of the catalyst assembly 100 to catalyze certain reactions such as reactions for converting NO to NO₂.

It has been found, according to one or more embodiments of the present invention, for a given NO$_x$ conversion rate, a catalyst composition containing a relatively higher base metal loading can achieve the given NO$_x$ conversion at a relatively lower operating temperature. Therefore, the catalyst can be strategically provided with a first portion configured for operation at a relatively higher temperature and a second portion configured for operation at a relatively lower temperature, wherein a first base metal loading in the first portion can be relatively reduced, and any portion or the whole of the reduced amount from the first portion can be added back to the second portion to enhance the relatively low temperature operation. As a result of this base metal segmentation and orientation, an overall temperature window can be broadened while the total amount of base metal required for carrying out the given NO$_x$ conversion is no greater than the amount otherwise needed without segmentation or orientation.

Figure 1B:
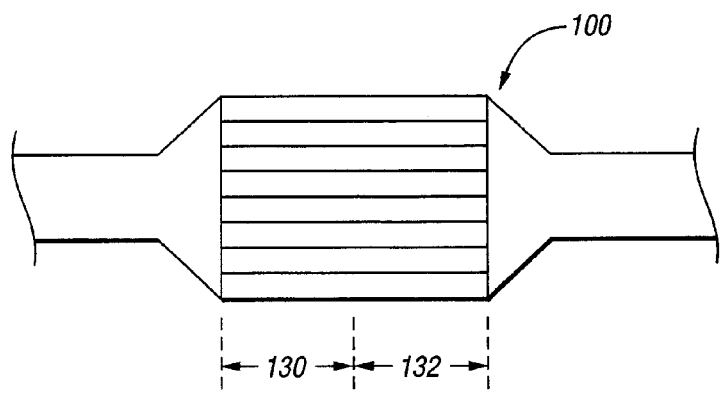
FIG. 1b depicts a schematic view of catalyst of FIG. 1a configured as a single brick having a first and a second portions.
Figure 1C:
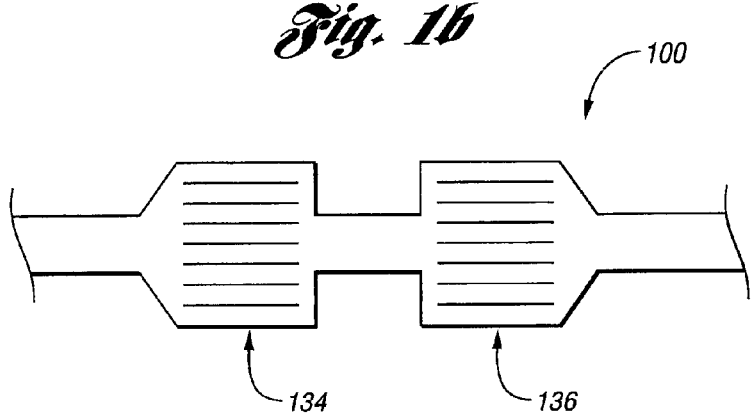
FIG. 1c depicts a schematic view of catalyst configured as two spaced apart bricks.
Figure 1B:
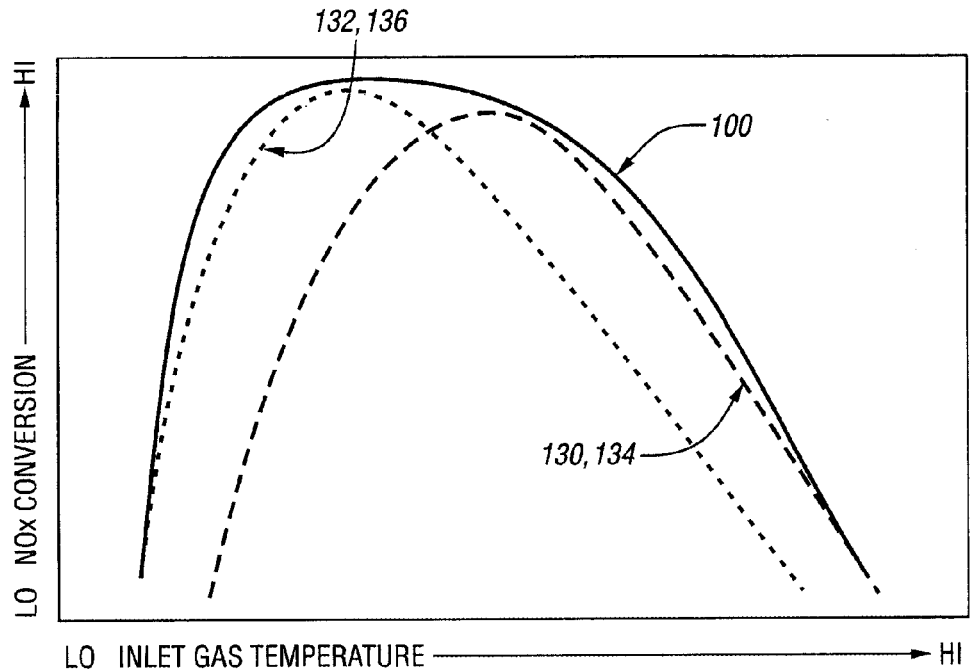

According to one aspect of the present invention, a catalyst assembly is provided for treating an exhaust from an engine. In one or more embodiments, and as depicted in FIGS. 1a-1c, the catalyst assembly generally shown at 100 includes a first catalytic portion 130 or 134 having a first catalyst material (not shown) catalytically active at a first temperature, the first catalyst material having a first base metal loading and a first catalyst material loading; and a second catalytic portion 132 or 136 having a second catalyst material (not shown) catalytically active at a second temperature lower than the first temperature, the second catalyst material having a second base metal loading and a second catalyst material loading, wherein the second base metal loading is higher than the first base metal loading.

As used herein according to one or more embodiments, the first or the second catalyst material is "catalytically active" in a given temperature when at that temperature, the first or the second catalyst material is able to convert 85 percent or more by volume of NOx to nitrogen.

In yet another embodiment, and as depicted in FIG. 1a, the first and second catalyst materials are positioned to be in contact with the exhaust 124 at a relatively higher temperature and a relatively lower temperature respectively.

As indicated, the catalyst assembly 100 can be provided with a relatively broadened temperature window for NO$_x$ conversion as compared to conventional catalyst compositions which are merely directed to operation at either relatively low temperatures, for instance at from 150° C. to 500° C. (degrees Celsius) or relatively high temperatures, for instance at from 450° C. to 750° C. As depicted in FIG. 1d, the catalyst assembly 100 can be formed of two or more formulations strategically arranged such that NO$_x$ conversion can be effectively carried out at temperatures where either formation alone does not deliver the same $NO_x$ conversion at a total given amount of base metal content.

For instance, and as depicted in FIG. 1b, the catalyst assembly 100 can be arranged as a single brick having a first portion 130 configured for operation at relatively high temperatures 450° C. to 750° C. and a second portion 132 configured for operation at relatively low temperatures 150° C. to 500° C. Alternatively, and as depicted in FIG. 1c, the catalyst assembly 100 may be arranged as two spaced apart bricks 134, 136, functionally equivalent to the first and second portions 130, 132 in relation to FIG. 1b. The catalyst assembly 100 can be modified, for instance, to include more than two portions or two bricks, as long as the catalyst assembly 100 as modified is still able to provide a broadened operating temperature window as described herein. For the purpose of illustration, the following description is directed to the catalyst assembly 100 arranged as a single catalyst brick as depicted in FIG. 1b. However, the same description is similarly applicable to alternative arrangements of the catalyst assembly 100 as indicated herein elsewhere.

Figure 2A:
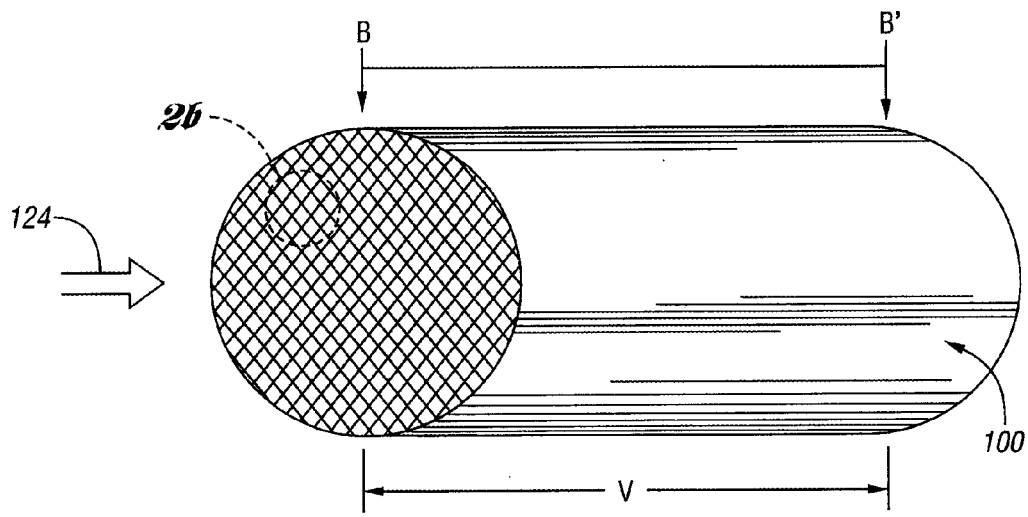
FIG. 2a depicts a schematic view of the catalyst of FIG. 1B having honeycomb type of flow channels.
Figure 2B:
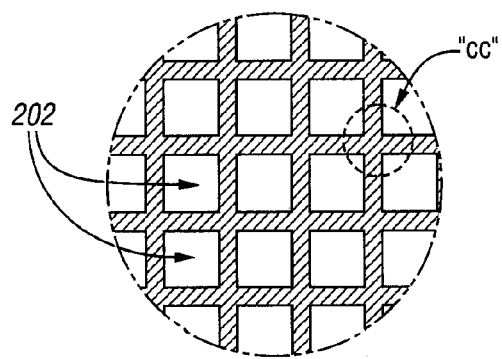

In one or more embodiments, and as depicted in FIG. 2a, the catalyst assembly 100 is arranged as a single brick having a plurality of honeycomb type flow channels 202 extending in a direction substantially parallel to the exhaust flow 124. FIG. 2b depicts an enlarged view of the cross-section of FIG. 2a. Area "cc" as depicted in FIG. 2b will be detailed in relation to FIG. 3d.

Figure 2C:
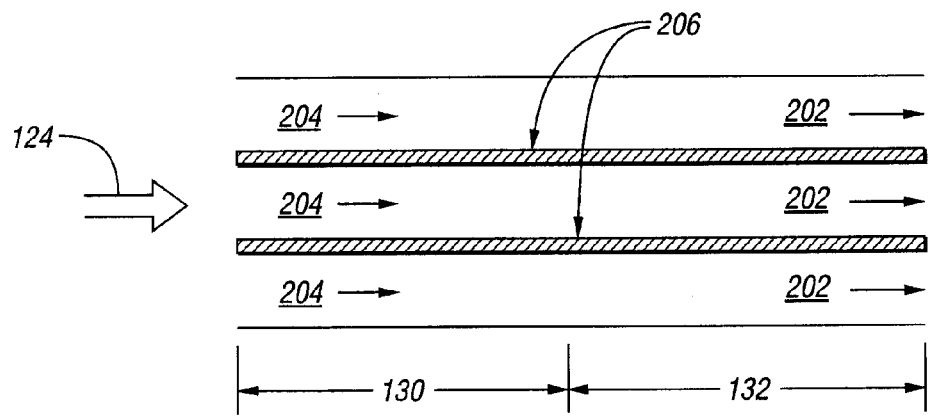
FIG. 2c depicts a vertical cross-section along line BB' of the catalyst of FIG. 2a, wherein the honeycomb flow channels are configured for flow-through operation.

A vertical cross-section taken along line BB' of the catalytic assembly 100, as depicted in FIG. 2c, illustratively shows open ends 204 of the flow-through channels 202 defined by the substrate walls 206. In this arrangement, a substantially amount of the exhaust 124 pass through the channels 202 and very little amount of the exhaust 124 passes through the substrate walls 206. This design of the substrate walls is useful where the catalyst assembly 100 functions as a flow-through SCR catalyst.

Figure 2D:
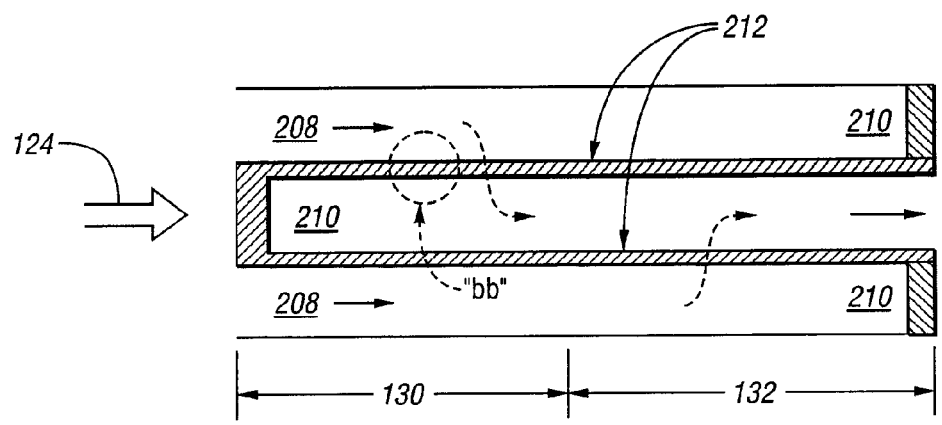
FIG. 2d depicts a vertical cross section along line BB' of the catalyst of FIG. 2a, wherein the honeycomb flow channels are configured for wall-flow operation.

Alternatively, and as depicted in FIG. 2d, the catalyst assembly 100 is configured as a wall-flow particulate filter supporting thereupon SCR catalyst materials. A vertical cross-section taken along line BB' of the catalytic assembly 100 illustratively shows open ends 208 and close ends 210 of the channels 202 defined by the substrate walls 212. In this arrangement, the exhaust 124 enters the channels 202 via open ends 208 and passes through the substrate walls 212. This design of the substrate walls is useful where the catalyst assembly 100 functions as a wall-flow particulate matter filter supporting SCR catalyst materials.

Figure 3A:
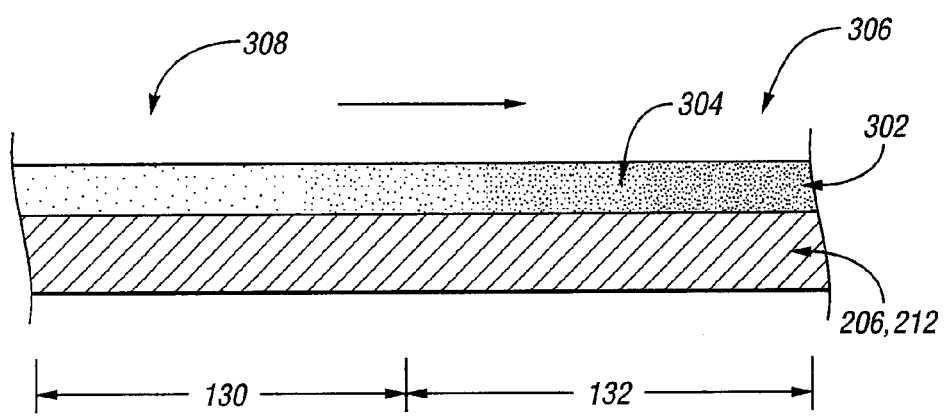
FIG. 3a depicts an enlarged view of a portion of the substrate walls in relation to FIGS. 2c and 2d.
Figure 3B:
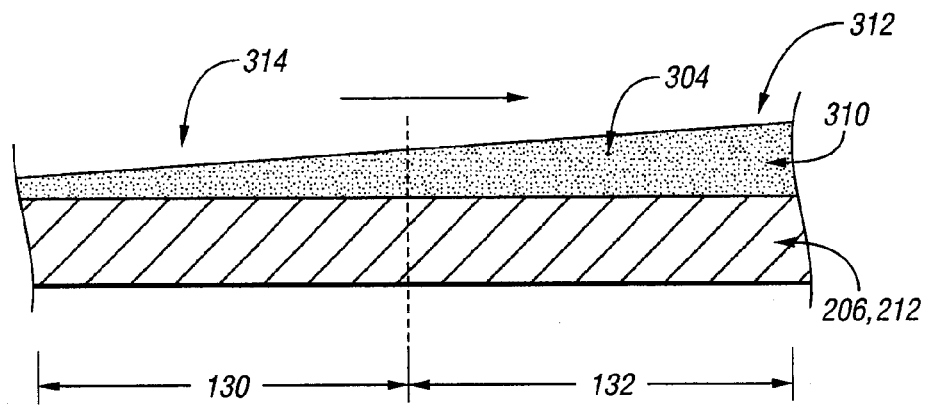
FIG. 3b depicts an another enlarged view of a portion of the substrate walls in relation to FIGS. 2c and 2d.
Figure 3C:
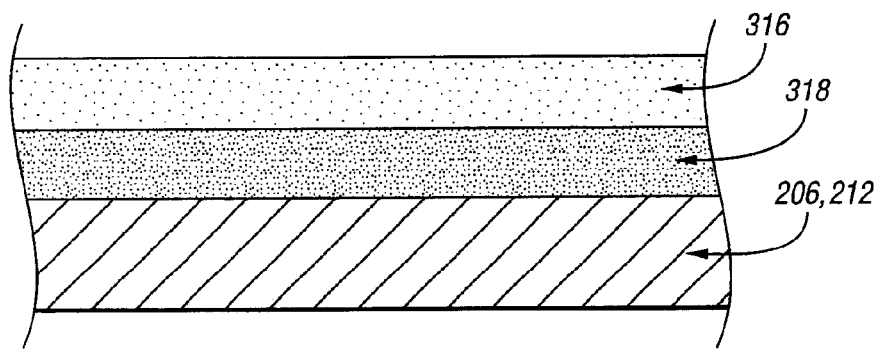
FIG. 3c depicts a yet another enlarged view of a portion of the substrate walls in relation to FIGS. 2c and 2d.
Figure 3B:
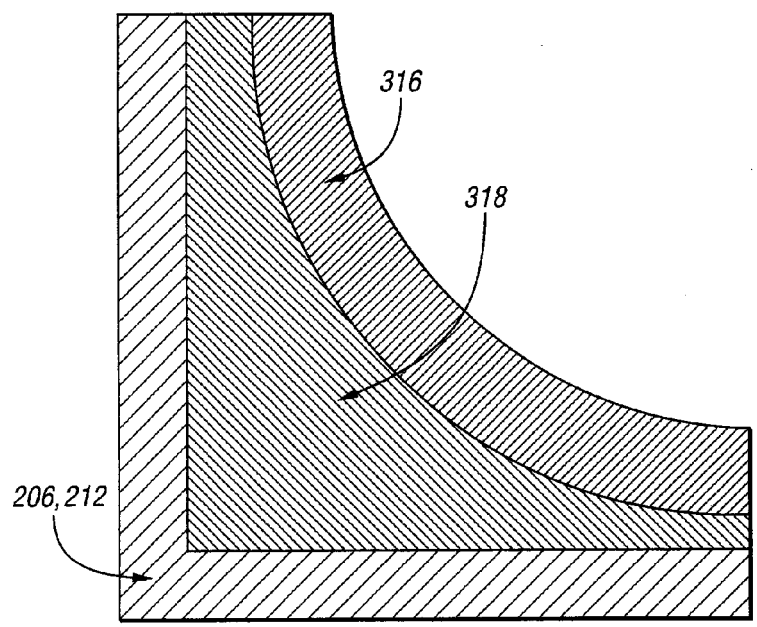
Figure 4:
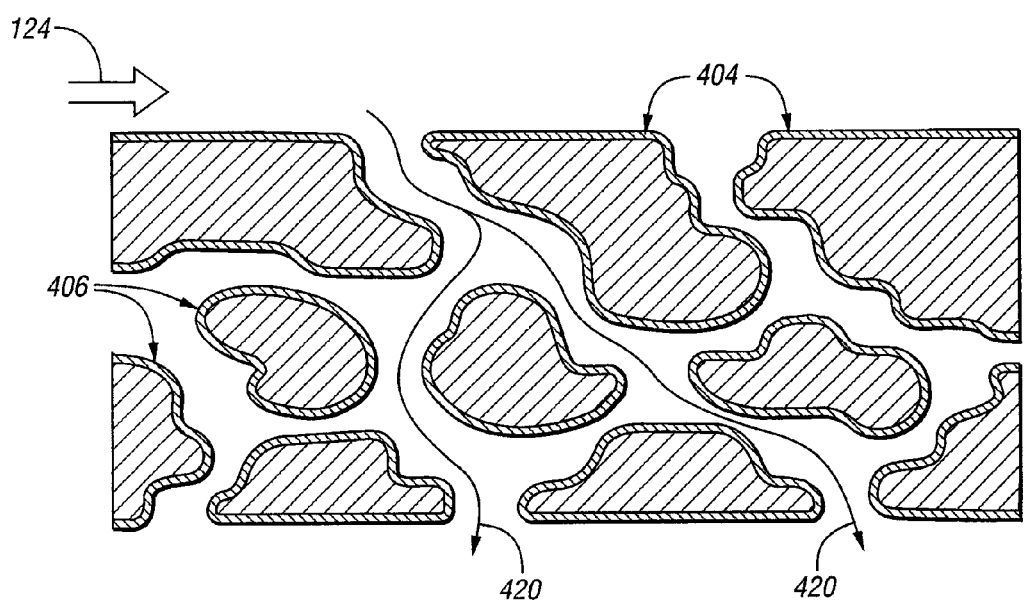
FIG. 4 depicts an enlarged view of a portion of the substrate walls showing internal pores in relation to FIG. 2d.

FIG. 4 depicts an enlarged view of a portion "bb" of the substrate walls 212 in relation to FIG. 2d, showing internal pores due to the relatively high porosity of the substrate walls 212, exemplifying a particular filter arrangement. Due to the presence of internal pores collectively shown as unshaded paths 420, the first and second catalyst materials can be applied to the wall surfaces 404 and/or the pore surfaces 406 in similar coating configuration discussed in relation to FIGS. 3a-3c. In particular, both the wall surfaces 404 and the pore surfaces 406 can be in contact with the catalyst layer 302 according to FIG. 3a, with the catalyst layer 310 according to FIG. 3b, with the catalyst layers 316 and 318 according to FIG. 3d.

In one or more embodiments, the differential base metal loading between the first and second portions 130, 132 of FIG. 1b can be arranged according to FIG. 3a wherein the substrate walls 206 of FIG. 2b and/or the substrate walls 212 of FIG. 2C can be in contact with a catalyst layer 302. As depicted in FIG. 3a, the catalyst layer 302 collectively represent in a continuous manner the first and second catalyst materials 308, 306 of the first and second portions 130, 132 respectively, with a generally heavier content of base metals 304 in the second portion 132 relative to the first portion 130. In certain particular instances, the catalyst coating 302 has substantially uniform coating thickness with an increasing content of the base metals 304 in the direction of an exhaust flow with arrow shown.

In one or more embodiments, the differential base metal loading between the first and second portions 130, 132 of FIG. 1b can be arranged according to FIG. 3b wherein the substrate walls 206 of FIG. 2b and/or the substrate walls 212 of FIG. 2C can be in contact with a catalyst layer 302. As depicted in FIG. 3b, the catalyst layer 302 collectively represent in a continuous manner the first and second catalyst materials 314, 312 of the first and second portions 130, 132 respectively, with a generally thicker loading of the second catalyst material in the second portion 132 relative to the first portion 130. In certain particular instances, the catalyst coating 302 is provided with a substantially uniform base metal loading in the direction of an exhaust flow with arrow shown but with an increasing coating thickness along the same direction.

In one or more embodiments, and as depicted in FIG. 3C, the substrate walls 206 of FIG. 2b, the substrate walls 212 of FIG. 2c and/or the internal pores 420 of FIG. 4 can be coated with a intermediate catalyst layer 318 as the first portion configured for operation at relatively lower temperatures and a top catalyst layer 316 as the second portion configured for operation at relatively higher temperatures. Relative to the top catalyst layer 316, the intermediate catalyst layer 318 can have more base metal loading and/or more catalyst material loading to be configured for operation at a relatively lower temperature.

In one or more embodiments, the substrate walls 206, 212 defining the flow channels 202 are collectively formed from a material known as a monolith, which is generally described as a ceramic block made of a number of substantially parallel flow channels such as flow channels 202. The monolith may be made of ceramic materials such as cordierite, mullite, and silicon carbide or metallic materials such as iron chromium alloy, stainless steel, and Inconel®. The channels can be substantially straight, hollow, and parallel to the flow of the exhaust, therefore flow obstruction to the exhaust is minimized. In the event that the substrate is configured as a wall-flow particulate filter for additionally removing the particulate matters, the substrate can further include cordierite, silicon carbide, metal fiber, paper, or combinations thereof.

In yet another embodiment, at least one of the first and second catalyst materials of the catalyst assembly 100 includes zeolite. The term "zeolite" generally refers to a framework aluminosilicate containing atoms of oxygen aluminum and/or silicon. An example of a natural zeolite is mordenite or a chabazite. Synthetic zeolites illustratively include type A as synthetic forms of mordenite, type B as ZSM-5® zeolites, and type Y as ultra-stabilized Beta zeolite. The framework structure of the zeolites often acquires an overall negative charge compensated for by exchangeable cations which may readily be replaced by other cations such as metal cations through methods including ion exchange. The $NO_x$ occluding catalyst typically includes an alkaline earth metal exchanged zeolite, precious metal exchanged zeolite such as platinum based and/or a base metal exchanged zeolite such as copper and iron based zeolites. While any type zeolite may be used, some suitable zeolites include X type zeolite, Y type zeolite, and/or ZSM-5 type zeolite.

In one or more embodiments, the first and second catalyst materials each independently include at least one base metal selected from the group consisting of copper, nickel, tin, zinc, iron, lead, aluminum, cerium, silver, and combinations thereof.

The first and second base metal loadings can each be defined in terms of grams of the base metal weight per liter of a total loading volume, generally shown at "V" in FIG. 2a.

In yet another embodiment, the first base metal loading as based on the total loading volume "V" of the catalyst assembly 100 is from 0.00 grams per liter (g/l), to 3.50 g/l, 0.00 g/l to 3.00 g/l, or 0.00 g/l to 2.50 g/l. The first base metal loading may be selected based on the substrate material for forming the catalyst assembly 100; however, the first base metal loading as selected is less than the second base metal loading. In certain particular instances, the first base metal loading is from 0.00 g/l to 2.33 g/l when, for instance, the catalyst assembly 100 is formed of cordierite substrate having 300 to 500 CPSI (cells per square inch) and having a wall thickness of 3.0 to 6.0 mil.

In yet another embodiment, the second base metal loading as based on the exterior volume of the catalyst assembly 100 is from 1.50 grams per liter (g/l) to 9.50 g/l, 2.0 g/l to 9.5 g/l, or 2.5 g/l to 9.5 g/l. The second base metal loading may be selected based on the substrate material for forming the catalyst assembly 100; however, the second base metal loading as selected is greater than the first base metal loading. In certain particular instances, the second base metal loading is from 2.33 g/l to 9.33 g/l when, for instance, the catalyst assembly 100 is formed of cordierite substrate having 300 to 500 CPSI and having a wall thickness of 3.0 to 6.0 mil.

The first and second catalyst material loadings can be provided in terms of grams of the catalytic material in dry weight per liter of a loading volume, generally shown at "V" in FIG. 2a. The first and second catalyst material loadings can each be dependent upon various parameters of the substrate, including substrate porosity, length to width aspect ratio, number of flow channels 202, and substrate wall thickness of the flow channels 202.

In yet another embodiment, the first catalyst material loading as based on the loading volume "V" of the catalyst assembly 100 is from 10 grams per liter (g/l) to 300 g/l, 10 g/l to 250 g/l, 10 g/l to 200 g/l, or 10 g/l to 150 g/l. In yet another embodiment, the second catalyst material loading as based on the loading volume "V" of the catalyst assembly 100 is from 50 g/l to 450 g/l, 100 g/l to 450 g/l, 150 g/l to 450 g/l, or 200 g/l to 450 g/l. The first and second catalyst material loadings are calculated based on dry weight of the catalyst materials or the washcoat materials illustratively including one or more of the base metals, one or more types of zeolites, one or more types of binders. In one or more embodiments, the first and the second catalyst material loadings are each referred to as a first and second washcoat loading.

One or more embodiments of the present invention are further illustrated by the following non-limiting examples.

EXAMPLES

Catalyst activity data are obtained using an automated laboratory scale flow reactor system. Custom-written LabVIEW based software with National Instruments data acquisition hardware is used to control MKS mass flow controllers and Lindberg Mini-Mite tubular furnaces. A computer controlled evaluation protocol is run for each same to decrease the test-to-test variations commonly observed by manual operation.

For all the SCR core samples tested in this example, the total gas flow rate is held constant at 6.44 liters/min while the sample size is held constant at 2.54 cm in diameter×2.54 cm in length. As a result, a space velocity equal to 30,000/hr is used in this example. The inlet gas temperature is maintained with one preheat tubular furnace followed by a second tubular furnace. The SCR core samples are loaded in quartz tubing and placed in the second tubular furnace. A Thermo Electron Antaris IGS FTIR Gas Analyzer with a heated sample cell is used at the outlet of the reactor to measure NO, $NO_2$, $N_2O$, $NH_3$, $CO_2$, and $H_2O$ levels. To cover the full exhaust temperatures expected on diesel vehicles, data are taken at inlet gas temperatures from approximately 150° C. to 700° C. in 25° C.-50° C. steps. The computer-controlled evaluation protocol steps the reaction temperature setting from a high temperature to low temperature for a prescribed duration. At each temperature setting, the duration is chosen so that post SCR gas composition is allowed enough time to equilibrate.

Tables 2-4 show the simulated diesel exhaust gas composition applied to each sample core to study the Standard SCR Reaction, the Fast SCR Reaction, and the Ammonia Oxidation Reaction, respectively. The molar NH3 to $NO_x$ ratio (ANR) is held constant at 1.0 to represent the stoichiometry of the well known Standard SCR Reaction and Fast SCR Reaction in Equations (1) and (2), respectively. Typical engine-out diesel exhaust contains a higher fraction of NO compared to $NO_2$. However, exhaust configurations with an upstream oxidation catalyst can be used to oxidize a portion of the NO to $NO_2$. Finally, the Ammonia Oxidation Reaction is employed to examine $NH_3$ oxidation by oxygen in the absence of $NO_x$ according to Equation (3).

$$\text{Standard SCR Reaction } 4NH_3+4NO+O_2 \rightarrow 4N_2+6H_2O \quad (1)$$

$$\text{Fast SCR Reaction } 2NH_3+NO+NO_2 \rightarrow 2N_2+3H_2O \quad (2)$$

$$\text{Ammonia Oxidation Reaction } 4NH_3+3O_2 \rightarrow N_2+6H_2O \quad (3)$$

The standard SCR reaction according to the Equation (1) is employed to determine $NO_x$ conversion efficiency of the SCR core samples when the inlet feed gas contains only NO as the $NO_x$ source as shown in Table 2. The fast SCR reaction according to the Equation (2) is employed to determine $NO_x$ conversion efficiency of the SCR core samples when the inlet feed gas contains both NO and $NO_2$ as the $NO_x$ source as shown in Table 3. It is well know in the art that a SCR catalyst performs better in $NO_x$ conversion reactions when an exhaust flow is provided with a relatively higher ratio of $NO_2$ relative to NO as the $NO_x$ source. An increase content of $NO_2$ can be realized with the use of an oxidation catalyst upstream of the SCR catalyst. This portion of the testing is to further explore the behavior patterns of the catalyst according to certain embodiments of the present invention. The ammonia oxidation reaction according to the Equation (3) is employed to show how well the SCR core samples tolerate the ammonia oxidation insult across a wide range of inlet temperatures

TABLE 2

Feed gas composition for examining the sample activity under the Standard SCR Reaction

| Feed Gas Composition | Standard SCR Reaction |
|---|---|
| NO (ppm) | 350 |
| $NO_2$ (ppm) | 0 |
| $NH_3$ (ppm) | 350 |
| $O_2$ (%) | 14.0 |
| $CO_2$ (%) | 5.0 |
| $H_2O$ (%) | 5.0 |
| $N_2$ | balance |

TABLE 3

Feed gas composition for examining the sample activity under the Fast SCR Reaction

| Feed Gas Composition | Standard SCR Reaction |
|---|---|
| NO (ppm) | 175 |
| $NO_2$ (ppm) | 175 |
| $NH_3$ (ppm) | 350 |
| $O_2$ (%) | 14.0 |
| $CO_2$ (%) | 5.0 |
| $H_2O$ (%) | 5.0 |
| $N_2$ | balance |

TABLE 4

Feed gas composition for examining the sample activity under the Ammonia Oxidation Reaction

| Feed Gas Composition | Standard SCR Reaction |
|---|---|
| NO (ppm) | 0 |
| $NO_2$ (ppm) | 0 |
| $NH_3$ (ppm) | 350 |
| $O_2$ (%) | 14.0 |
| $CO_2$ (%) | 5.0 |
| $H_2O$ (%) | 5.0 |
| $N_2$ | balance |

Figure 5A:
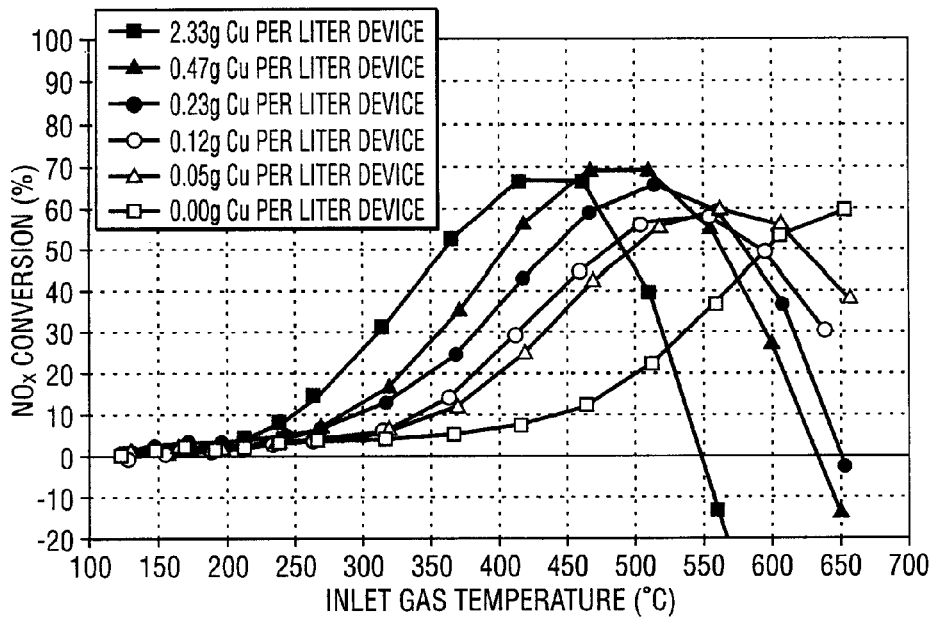
FIG. 5a depicts a plot of NOx conversion for a copper-containing SCR core sample, as a function of inlet gas temperature when only NO is introduced into the inlet gas, as referenced in the Example section.

FIG. 5a depicts $NO_x$ conversion efficiency, according to Equation (1), as a function of inlet gas temperature among the SCR core samples with various copper loadings, wherein the catalyst core samples have been degreened and the inlet gas contains NO only as the $NO_x$. As can be seen from FIG. 5a, at an inlet gas temperature up to about 450° C., $NO_x$ conversion efficiency increases with the copper loading for all the samples. For the SCR core samples having a copper content of 0.23 g/l, 0.47 g/l, and 2.33 g/l, corresponding $NO_x$ conversion starts to decrease sharply from between 450° C. to 500° C. For the SCR core samples having relatively lower copper content of 0.12 g/l, and 0.05 g/l, corresponding $NO_x$ conversion peaks at between 500° C. to 550° C. and does not start to fall until after about 550° C.

Figure 5B:
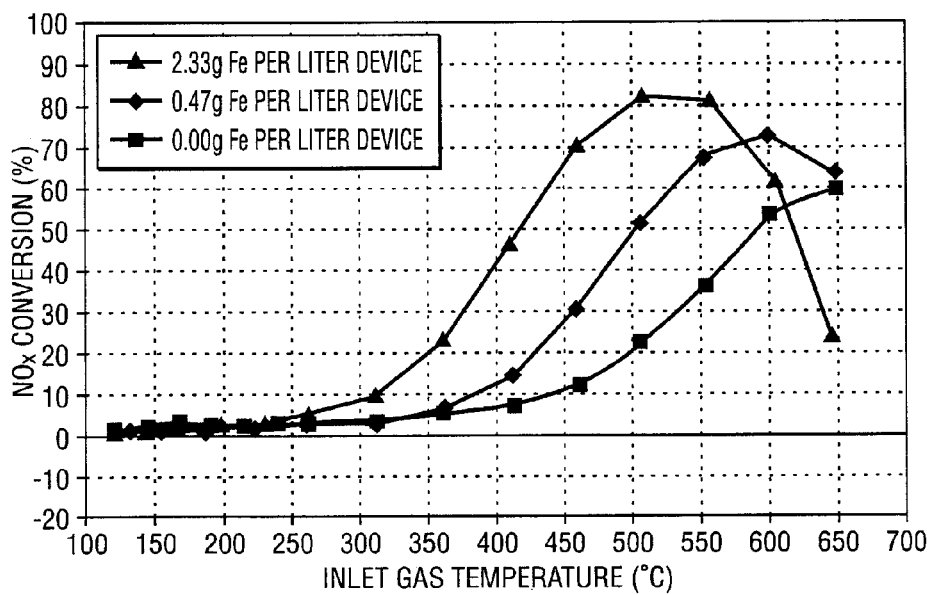
FIG. 5b depicts a plot of $NO_x$ conversion for an iron-containing SCR core sample, as a function of inlet gas temperature when only NO is introduced into the inlet gas, as referenced in the Example section.
Figure 6A:
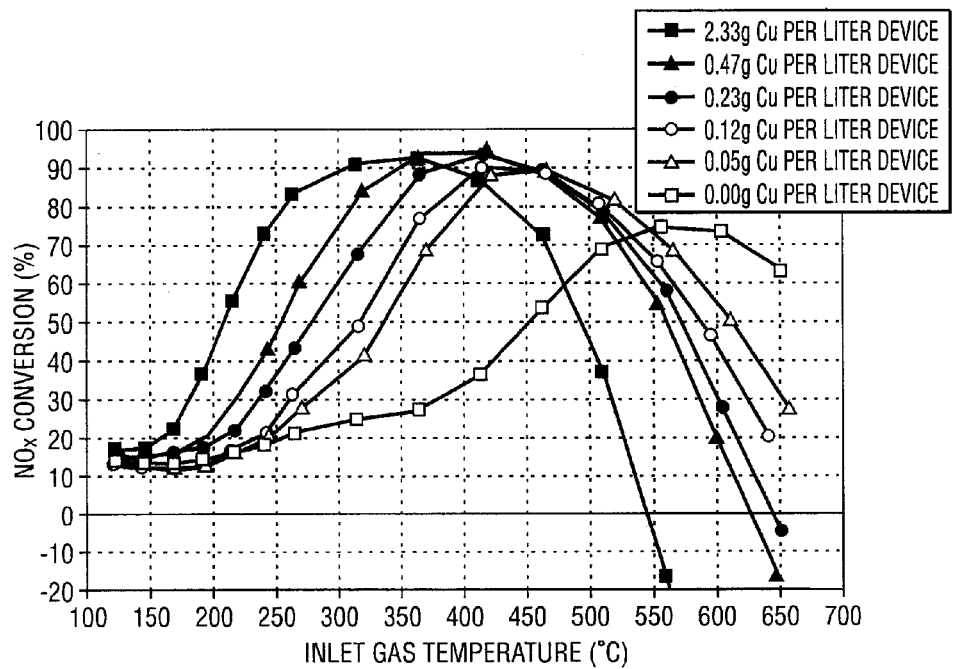
FIG. 6a depicts a plot of $NO_x$ conversion for a copper-containing SCR core sample, as a function of inlet gas temperature when 50/50 $NO/NO_2$ is introduced into the inlet gas, as referenced in the Example section.

FIG. 5b depicts $NO_x$ conversion efficiency as a function of inlet gas temperature among the SCR core samples with various iron loadings according to Equation (1), wherein the catalyst core samples have been degreened and the inlet gas contains NO only as the $NO_x$. As can be seen from FIG. 5b, the iron containing SCR core samples behave similarly to the corresponding copper containing SCR core samples of FIG. 5a;

FIG. 6a depicts $NO_x$ conversion, according to Equation (2), as a function of inlet gas temperature for SCR core samples with various copper loadings, wherein the SCR core samples have been degreened and the inlet gas contains NO and $NO_2$ in equal share. As can be seen from FIG. 6a, at an inlet gas temperature up to about 360° C., $NO_x$ conversion efficiency increases with the copper loading for all the core samples. For these SCR core samples having a copper content of 0.23 g/l, 0.47 g/l and 2.33 g/l, corresponding $NO_x$ conversion peaks and then starts to decrease sharply at about 375° C. For the SCR core samples having relatively lower copper content of 0.12 g/l and 0.05 g/l, corresponding $NO_x$ conversion peaks and starts to decrease at about 450° C. Interestingly, for a given $NO_x$ conversion of between about 30 percent to about 85 percent, the inlet gas temperature is reciprocal to the copper loading. For instance, the SCR core sample having 2.33 g/l copper elicits a 60 percent $NO_x$ conversion at an inlet temperature of about 220° C.; the SCR core sample having 0.47 g/l of copper elicits a 60 percent $NO_x$ conversion at an inlet temperature of about 270° C.; the SCR core sample having 0.23 g/l of copper elicits a 60 percent $NO_x$ conversion at an inlet temperature of about 300° C.; the SCR core sample having 0.12 g/l of copper elicits a 60 percent $NO_x$ conversion at an inlet temperature of about 330 C; and the SCR core sample having 0.05 g/l of copper elicits a 60 percent $NO_x$ conversion at an inlet temperature of about 350° C. In other words, and as can be observed from the results shown herein, for a given $NO_x$ conversion, the higher is the inlet temperature the lower the copper content is needed.

Figure 6B:
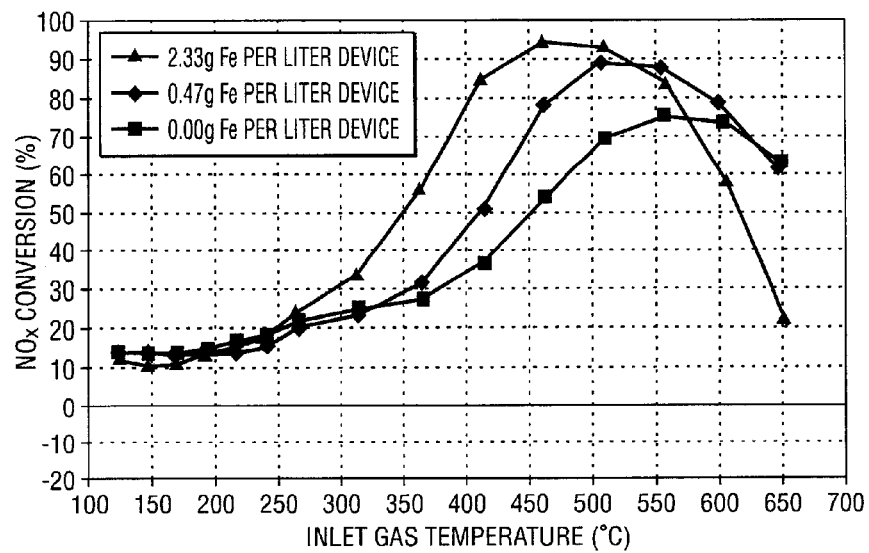
FIG. 6b depicts a result graph of $NO_x$ conversion for an iron-containing SCR core sample, as a function of inlet gas temperature when 50/50 $NO/NO_2$ is introduced into the inlet gas, as referenced in the Example section.
Figure 7A:
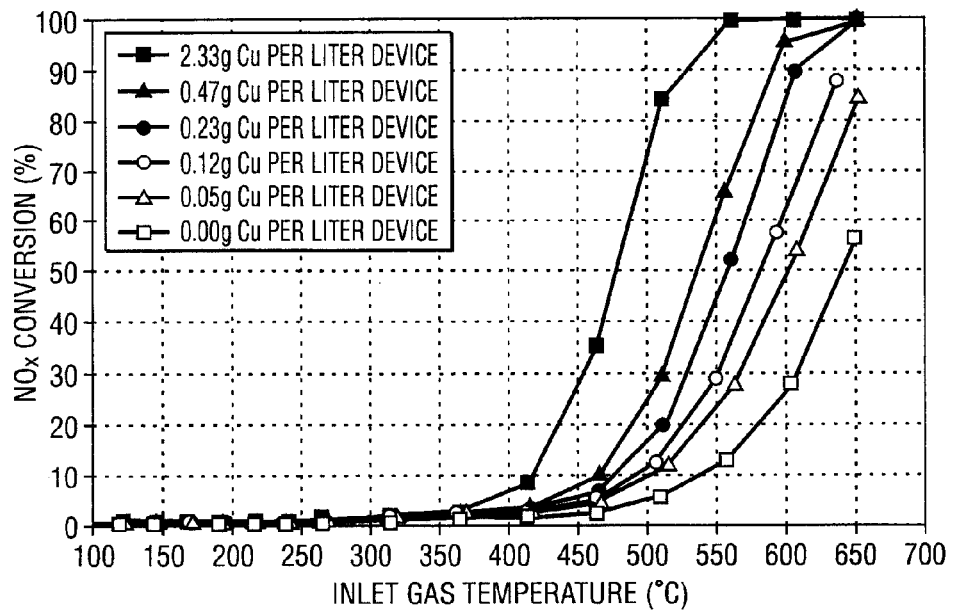
FIG. 7a depicts a plot of $NH_3$ oxidation for a copper-containing SCR core sample, as a function of inlet gas temperature when the inlet gas contains $NH_3$ and does not contain NO or $NO_2$, as referenced in the Example section.
Figure 7B:
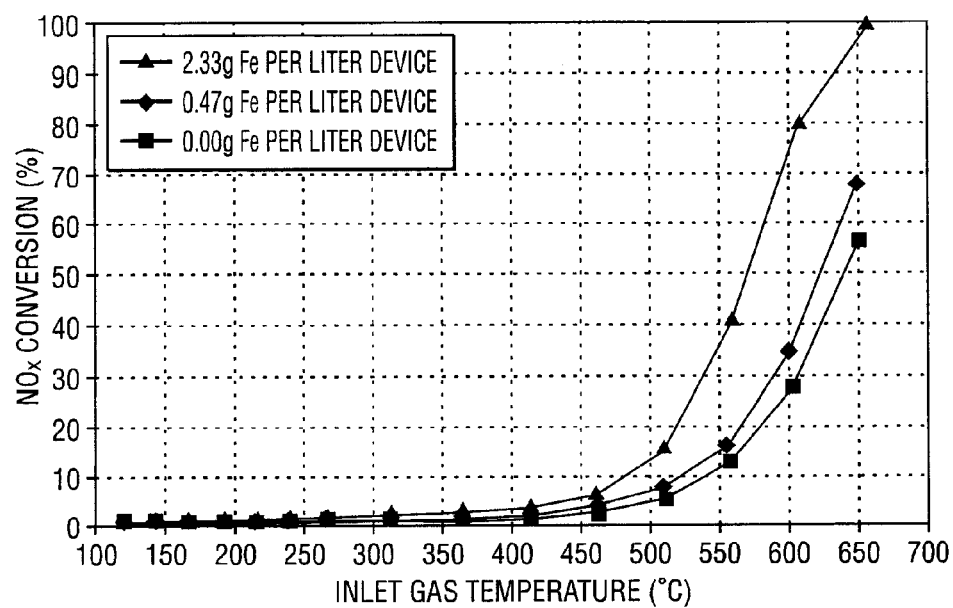
FIG. 7b depicts a plot of $NH_3$ oxidation for an iron-containing SCR core sample, as a function of inlet gas temperature when the inlet gas contains NH₃ and does not contain NO or NO₂, as referenced in the Example section.

FIG. 6b depicts $NO_x$ conversion efficiency as a function of inlet gas temperature among the SCR core samples with various iron loadings according to Equation (2), wherein the catalyst core samples have been degreened and the inlet gas contains an equal share of NO and $NO_2$. As can be seen from FIG. 6b, the iron containing SCR core samples behave similarly to the corresponding copper containing SCR core samples of FIG. 6a;

FIG. 7a depicts $NH_3$ oxidation, according to Equation (3), as a function of inlet gas temperature for SCR core samples with various copper loadings, wherein the SCR core samples have been degreened and the inlet gas contains $NH_3$ as the only nitrogen source. As well known in the art, $NH_3$ oxidation is an undesirable side reaction competing for oxygen in an exhaust gas flow. As can be seen from FIG. 7a, all SCR core samples show little or no $NH_3$ oxidation at an inlet temperature up to 400° C. and elicit a suddenly increased extent of $NH_3$ oxidation from about 420° C. to about 550° C. Moreover, at an inlet gas temperature from between about 400° C. to about 550° C., $NH_3$ oxidation is observed to increase with the copper loading. For instance, at the inlet gas temperature of 550° C., $NH_3$ oxidation for the SCR core sample having 2.33 g/l copper is about 96 percent, for the SCR core sample having 0.47 g/l copper is about 65 percent, for the catalyst core sample having 0.23 g/l copper is about 45 percent, for the SCR core sample having 0.12 g/l of copper is about 33 percent, for the SCR core sample having 0.05 g/l of copper is about 22 percent, and for the SCR core sample having 0.00 g/l of copper is about 10 percent.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   contacting an NOx exhaust with an upstream catalyst material coated onto a substrate and including copper or iron loaded in a first zeolite at an upstream loading of 0 to 3.5 g/l to convert the NOx exhaust in a first temperature range of 150° C. to 500° C. to a first NOx converted exhaust; and
   contacting the first NOx converted exhaust with a downstream catalyst material coated onto the substrate downstream of the upstream catalyst material and including copper or iron loaded in a second zeolite at a downstream loading of 1.5 to 9.5 g/l to convert the first NOx converted exhaust in a second temperature range of 450° C. to 700° C.

2. The method of claim 1, further comprising contacting the NOx exhaust with an oxidation catalyst prior to the first contacting step.

3. The method of claim 1, wherein the substrate includes a plurality of flow channels.

4. The method of claim 1, wherein each of the upstream and downstream catalyst materials is copper.

5. The method of claim 1, wherein the first and second base metals are iron.

6. The method of claim 1, wherein each of the first and second zeolites is an alkaline earth metal exchanged zeolite.

7. The method of claim 1, wherein each of the first and second zeolites is a precious metal exchanged zeolite.

8. A method comprising:
   coating an upstream substrate with an upstream catalyst material including copper at an upstream loading; and
   coating a downstream substrate with a downstream catalyst material including copper at a downstream loading, the upstream and downstream copper loadings are substantially uniform and the upstream and downstream catalyst materials have an increasing coating thickness in an exhaust flow direction.

9. The method of claim 8, wherein the upstream catalyst material has a NOx conversion activity at a first temperature and the downstream catalyst material has a NOx conversion activity at a second temperature less than the first temperature.

10. The method of claim 8, further comprising forming the upstream and downstream substrates as a monolith.

11. The method of claim 10, wherein the monolith is a ceramic material.

12. The method of claim 10, wherein the monolith is a metallic material.

13. The method of claim 10, wherein the monolith includes a plurality of flow channels.

14. A method comprising:
   coating an upstream substrate with an upstream catalyst material including copper at an upstream loading; and
   coating a downstream substrate with a downstream catalyst material including copper at a downstream loading, the upstream and downstream copper loadings are substantially uniform and the upstream and downstream catalyst materials have an increasing coating thickness in an exhaust flow direction, and one of the upstream and the downstream substrates is a wall flow ceramic substrate.

15. The method of claim 14, wherein both of the upstream and downstream substrates are wall flow ceramic substrates.

16. The method of claim 15, further comprising forming the upstream and downstream substrates as a monolith.

17. The method of claim 16, wherein the monolith includes a plurality of flow channels.

18. The method of claim 14, wherein the upstream catalyst material has a NOx conversion activity at a first temperature and the downstream catalyst material has a NOx conversion activity at a second temperature less than the first temperature.

19. The method of claim 14, wherein the wall flow ceramic substrate includes cordierite.

20. The method of claim 14, wherein the wall flow ceramic substrate includes mullite.

* * * * *